(12) United States Patent
Rydenhag (10) Patent No.: US 7,814,220 B2
(45) Date of Patent: Oct. 12, 2010

(54) USER INTERFACE FOR AN ELECTRONIC DEVICE

(75) Inventor: Tobias Rydenhag, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1205 days.

(21) Appl. No.: 11/226,575

(22) Filed: Sep. 14, 2005

(65) Prior Publication Data

US 2007/0061409 A1 Mar. 15, 2007

(51) Int. Cl.
*G06F 15/16* (2006.01)
*H04N 7/16* (2006.01)

(52) U.S. Cl. ................. 709/231; 709/217; 709/203; 709/229; 709/213; 709/214; 709/215; 709/216; 709/218; 345/156; 455/550.1; 455/3.04; 455/3.02; 455/428; 725/124; 725/133; 725/142

(58) Field of Classification Search .................. 709/228, 709/245, 204, 231, 203, 213–219, 229
See application file for complete search history.

(56) References Cited

U.S. PATENT DOCUMENTS 6,721,489 B1 * 4/2004 Benyamin et al. ............. 386/46

2005/0053352 A1 * 3/2005 McKain et al. ............... 386/46
2006/0156239 A1 * 7/2006 Jobs et al. ................... 715/727
2006/0262103 A1 * 11/2006 Hu et al. ..................... 345/173

FOREIGN PATENT DOCUMENTS

EP           1 411 512 A2    4/2004
WO    WO 2004/008460 A1    1/2004

\* cited by examiner

*Primary Examiner*—Jude J Jean Gilles
(74) *Attorney, Agent, or Firm*—Myers Bigel Sibley & Sajovec, P.A.

(57) ABSTRACT

An electronic device includes a media player and a control unit operable to selectively access any one of a plurality of different types of media sources, such as a local media file memory, and at least one signal input for media data received through a communication connection from an external source, such as a streaming media data or a real time FM radio signal. A user-operable key is carried on the device, which upon activation triggers the control unit to store data related to a currently accessed media source in a playlist. Both the storage and selection of a playlist, which are dependent on from which type of media source the media data is accessed, are performed automatically in the device.

33 Claims, 3 Drawing Sheets

USER INTERFACE FOR AN ELECTRONIC DEVICE

FIELD OF THE INVENTION

The present invention relates to electronic devices comprising media players capable of presenting media from a plurality of different types of media sources, by means of a user output interface. More particularly, the invention relates to a user input interface, which upon activation is arranged to automatically store data related to a currently presented media item, and to select a playlist for the stored data which is chosen dependent on the type of media source from which the media item is accessed. The user interface is thus transparent and user-friendly, in that it is adapted to trigger different actions dependent on characteristics of the media item presently presented, be it sound or images.

BACKGROUND OF THE INVENTION

Electronic devices such as mobile phones and computers including wireless communication transceivers typically include both a user input interface in the form of keys or buttons, and a user output interface in the form of one or more displays. Audio interfaces are normally also included by means of speakers and microphones. In terms of traditional telephony services, user input keys are typically used for setting up calls, whereas the microphone and the speaker are used for standard speech communication.

In recent years, mobile phones have become much more than pure speech communication devices. Fast development and miniaturization in battery technology and electronic components, as well as the breakthrough of small high resolution color displays, has lead to compact radio communication terminals more and more taking the form of media terminals. Many mobile phones of today are capable of receiving FM radio, and comprise digital media players for playing music. Digital video may also be stored and presented on the display of some types of terminals. It is generally possible for a user to access locally stored media items through playlists including stored media items, or to access radio channels through radio station playlists. It is also possible to create personal playlists of e.g. locally stored music tracks, such as a playlist including a number of specifically selected songs, or a playlist with a predefined set of music tracks collected from a certain artist or representing a certain style or genre. Activation of that playlist will then trigger the media player to play the items defined in the list, either in the playlist order or in random order. Activation of an FM radio channel in a radio playlist will set a tuner to the frequency of that channel and play it in real time without storing. The played items are presented on the user output of the terminal, i.e. on the display in the case of video, or through a speaker or earpiece in the case of audio.

However, there are today many different ways and sources for accessing media items in a portable radio communication terminal. Locally stored media is one source and FM radio is another. Yet another type of media source is streaming video or audio. Streaming audio is one-way audio transmission over a data network, and is widely used on the Internet as well as private intranets to deliver audio on demand or an audio broadcast, so called Internet radio or web radio. Unlike audio files used for storing in local memories in the terminal, such as wav and mp3, which are played after they are downloaded, streaming audio is played within a few seconds of requesting it and the data is not stored permanently in the terminal. If the streaming audio is broadcast live, it is sometimes called "realtime audio". However, technically, realtime means no delays, and there is a built-in delay in streaming audio (see realtime audio). The reason for this is that listening to momentary blips in music or a conversation is annoying, and the only way to compensate for that over an erratic network such as the Internet is to get some of the audio data into the computer before you start listening to it. In streaming audio, both the client and server cooperate for uninterrupted sound. The client side stores a few seconds of sound in a data buffer before it starts sending it to the speakers. Throughout the session, it continues to receive audio data ahead of time. One existing example of streaming radio is provided by Sony® under the name StreamMan. StreamMan is a mobile streaming music solution provided to mobile operators, and offers personalized channels according to user's mood or activity, or by adaptation by rating of different tracks played, performed by the user. StreamMan also offers playlists, download and a community feature.

Management of media items in radio communication terminals is predominantly performed by means of a graphical user interface presented on the terminal display, and user commands through a the user input interface, including e.g. keys or a touch-sensitive display. However, regardless of how advanced the terminal is it is still a major market requirement that the terminal is compact and lightweight. This puts a constraint on the size of the display and the graphical user interface for presenting information menus. Therefore, access of media items, such as music tracks and movies in digital form, is typically performed through menu systems in which different media sources and playlists can be found by browsing. Smart keys and navigation systems have been developed by many terminal manufacturers over the years, due to the fact that the more functions a terminal can hold, the more complex the navigation system tends to become. Finding the right menu and playlist for storing or accessing media items in different menus may therefore be a tricky task. A simplified way of handling media items in radio communication terminals would therefore be desirable.

SUMMARY OF THE INVENTION

According to some embodiments of the present invention, an electronic device, comprises a media player and a control unit that is operable to selectively access any one of a plurality of different types of media sources, including a memory comprising locally stored media data, a signal input for media data received through a communication connection from an external source, and a media recorder for capturing media data from the surrounding of the terminal. A user-operable key is configured to upon activation trigger the control unit to store data related to a currently accessed media source in a playlist, which playlist is automatically selected dependent on from which type of media source the media data is accessed.

In other embodiments, said memory holds one or more media files, which may be played using said media player, and wherein activation of the user-operable key triggers storing of a directory address to a currently played media file in a local playlist.

In still other embodiments, the electronic device further comprises a communication interface connectable to a communication station over a network, and a transceiver unit, for transmitting the local playlist to the communication station and receiving offers from the communication station tailored according to the content of the local playlist.

In still other embodiments, said signal input comprises a streaming media signal input with a data buffer, wherein activation of the user-operable key triggers storing of an identity code, associated with a currently received media signal, in a streaming media playlist.

In still other embodiments, said identity code is retrieved from the streaming radio signal.

In still other embodiments, said signal input comprises a modulated radio signal input with a demodulator, wherein activation of the user-operable key triggers recording of a clip of a media item from a received modulated radio signal, and storing of a tag associated with the recorded clip in a media tag playlist.

In still other embodiments, the media recorder comprises a microphone, and activation of the user-operable key triggers recording of an audio clip of what is received by the microphone, and storing of a tag associated with the recorded audio clip in an audio tag playlist.

In still other embodiments, the media recorder comprises a camera, and activation of the user-operable key triggers recording of an image clip of what is recorded by the camera, and storing of a tag associated with the recorded image clip in an image tag playlist.

In still other embodiments, the electronic device further comprises a communication interface connectable to transmit an audio clip to a music detection station over a network, and to receive information related to the content of the audio clip as retrieved by the music detection station.

In further embodiments of the present invention, a radio communication terminal comprises an audio output, an audio player configured to play music tracks through the audio output, a control unit, operable to selectively access a music track from any one of a plurality of different types of media sources, and a user-operable key, which upon activation when a music track is played triggers the control unit to store data related to that music track in a playlist, which playlist is automatically selected dependent on from which type of media source the music track has been accessed.

In further embodiments, said plurality of different types of media sources comprises a local memory for storing audio files, and activation of the user-operable key triggers storing of a directory address of the audio file associated with the played music track in a local playlist.

In still further embodiments, said local memory is connectable to a detachable memory stick.

In still further embodiments, the radio communication terminal further comprises a communication interface connectable to a communication station over a network for transmitting the local playlist to the communication station and receiving offers from the communication station tailored according to the content of the local playlist.

In still further embodiments, said plurality of different types of media sources comprises a streaming radio signal input with a data buffer, and activation of the user-operable key triggers storing of an identity code, associated with the played music track, in a streaming radio playlist.

In still further embodiments, the radio communication terminal further comprises a communication interface connectable to a streaming radio station over a network for transmitting the streaming radio playlist to the streaming radio station to configure a personal streaming radio channel transmitted by the streaming radio station dependent on the content of the streaming radio playlist.

In still further embodiments, said plurality of different types of media sources comprises a modulated radio signal input with a demodulator, and activation of the user-operable key triggers recording of an audio clip of the played music track using an audio recorder connected to the media player, wherein the a tag associated with the recorded audio clip is stored in an audio tag playlist.

In still further embodiments, said plurality of different types of media sources comprises a microphone, wherein activation of the user-operable key triggers recording of an audio clip of what is currently received by the microphone using an audio recorder connected to the microphone, wherein the a tag associated with the recorded audio clip is stored in an audio tag playlist.

In still further embodiments, the radio communication terminal further comprises a communication interface connectable to transmit an audio clip to a music detection station over a network, and to receive information related to the content of the audio clip as retrieved by the music detection station.

In still further embodiments, the radio communication terminal further comprises a communication interface including a transceiver unit and an antenna for wireless connection with a radio base station of a network, and a data storage and access unit for accessing data related to a playlist and incorporating said data in a communications signal addressed to a receiving station in said network.

In still further embodiments, the radio communication terminal further comprises a communication interface including a transceiver unit and a system connector for connection with the Internet via a computer, and a data storage and access unit for accessing data related to a playlist and incorporating said data in a communications signal addressed to a receiving station on the Internet.

In other embodiments of the present invention, a media player comprises a media presentation unit, a first media source including a media file memory for storing media files, a second media source including a media signal input for receiving a media signal, a control unit, operable to selectively control access and presentation of a media item from the first or the second media source on the media output, a user interface input connected to the control unit, wherein activation of the user interface during presentation of a media item triggers storing of data related to that media item in a playlist which is automatically selected dependent on from media source the presented media item is accessed.

In still other embodiments, the media player is configured to play video items, wherein the media presentation unit comprises a speaker or a port to an external speaker, for presentation of audio items.

In still other embodiments, said audio item is a music track.

In still other embodiments, the media player is configured to play video items, wherein the user interface output comprises a display or a port to an external display, for presentation of images.

In still other embodiments, the media signal input is configured to receive a media signal in the form of streaming media code, and comprises a data buffer for buffering a received media signal before presentation.

In still other embodiments, activation of the user interface input during presentation of a media item accessed from the first media source triggers the control unit to store a directory address of the data file associated with that media item in a local playlist related to the media file memory.

In still other embodiments, activation of the user interface input during presentation of a media item accessed from the second media source triggers the control unit to store an identity code associated with that media item in a streaming media playlist.

In still other embodiments, the media signal input is adapted to receive a real time media signal in the form of a modulated signal, and comprises a demodulator for retrieving a media item from the media signal for presentation.

In still other embodiments, the media player comprises a third media source including a second media signal input for receiving a real time media signal in the form of a modulated signal, which second media signal input comprises a demodulator for retrieving a media item from the media signal for presentation.

In still other embodiments, the media player further comprises a media recorder configured to record a real time media signal representing a media item, and a media clip memory, wherein activation of the user interface during presentation of a media item from a received real time media signal triggers the control unit to record a media clip of that media item, and to store a tag associated with the recorded media clip in a media tag playlist.

In still other embodiments, the real time media signal is a frequency modulated radio signal.

In still other embodiments, the media player comprises at least a portion of a radio communication terminal.

In still other embodiments, said user interface input is a key carried on the media player.

BRIEF DESCRIPTION OF THE DRAWINGS

The features and advantages of the present invention will be apparent from the following detailed description of the invention and preferred embodiments, with reference to the accompanying drawings, in which FIG. 1 schematically illustrates a first embodiment of the invention, including a radio communication terminal carrying a key for automatically storing media data relating to a currently played or captured media item.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An improved way of managing media items in media players, or a radio communication terminal incorporating a media player, is provided, where said media items are accessible from different types of media sources. This object is fulfilled by providing the media player with a user interface input, such as a key, a display-related softkey or a touch-sensitive display, activation of which triggers automatic storing of data related to a currently played media item in a playlist which is dedicated to the type of media source from which media item is accessed. This way, a single user interface input is easily usable for storing media item data regardless of type in a transparent way into playlists where it later may be accessed and presented, played or further processed for e.g. downloading, collecting more related information over a network, or sharing with other users.

The present description relates to the field of electronic devices including media players for presenting audio and/or video to a user, which are capable of accessing media items from different types of media sources including locally stored media files and received real time or streaming media signals. In various embodiments, the media player according to the invention is incorporated in a radio communication terminal, such as a mobile phone or a computer devised for radio communication. Such a radio communication terminal comprises a display and an associated graphical user interface for presentation of information and images, or an output port for transmitting image data to an external display. The terminal also comprises an audio output, typically at least one speaker and/or an output port for connecting an external speaker device such as an earpiece or a portable handsfree. Connection of external devices for presentation of images or sound may be wire-bound or wireless using e.g. optical solutions or radio. The radio communication terminal is also equipped with a user input interface, preferably comprising keys or buttons. It should be noted that the term key of the user input interface is to be interpreted broadly, as a means for a user to actively input a symbol or a command into the terminal. A key may therefore be a mechanical button, ball or joystick which is operated by depression or movement. It may alternatively be a separate touch-sensitive area, or realized by making the display touch-sensitive, such that user input is detected upon touching the key in question. The user input interface may alternatively or additionally comprise software and an associated microprocessor system for handling voice commands uttered into a speaker of the terminal.

The present inventions is mainly described herein as usable in connection with an electronic device in the form of a radio communication terminal, more particularly a mobile phone, including a media player, but as mentioned other types of radio communication terminals may incorporate a media player devised according to the invention, such as desktop computers, laptop computers, communicators, electronic organizers, PDAs (Personal Digital Assistants), and digital cameras. Furthermore, it should be emphasized that the term comprising or comprises, when used in this description and in the appended claims to indicate included features, elements or steps, is in no way to be interpreted as excluding the presence of other features elements or steps than those expressly stated.

Examples of embodiments will now be described with references made to the accompanying drawing.

Figure 1:
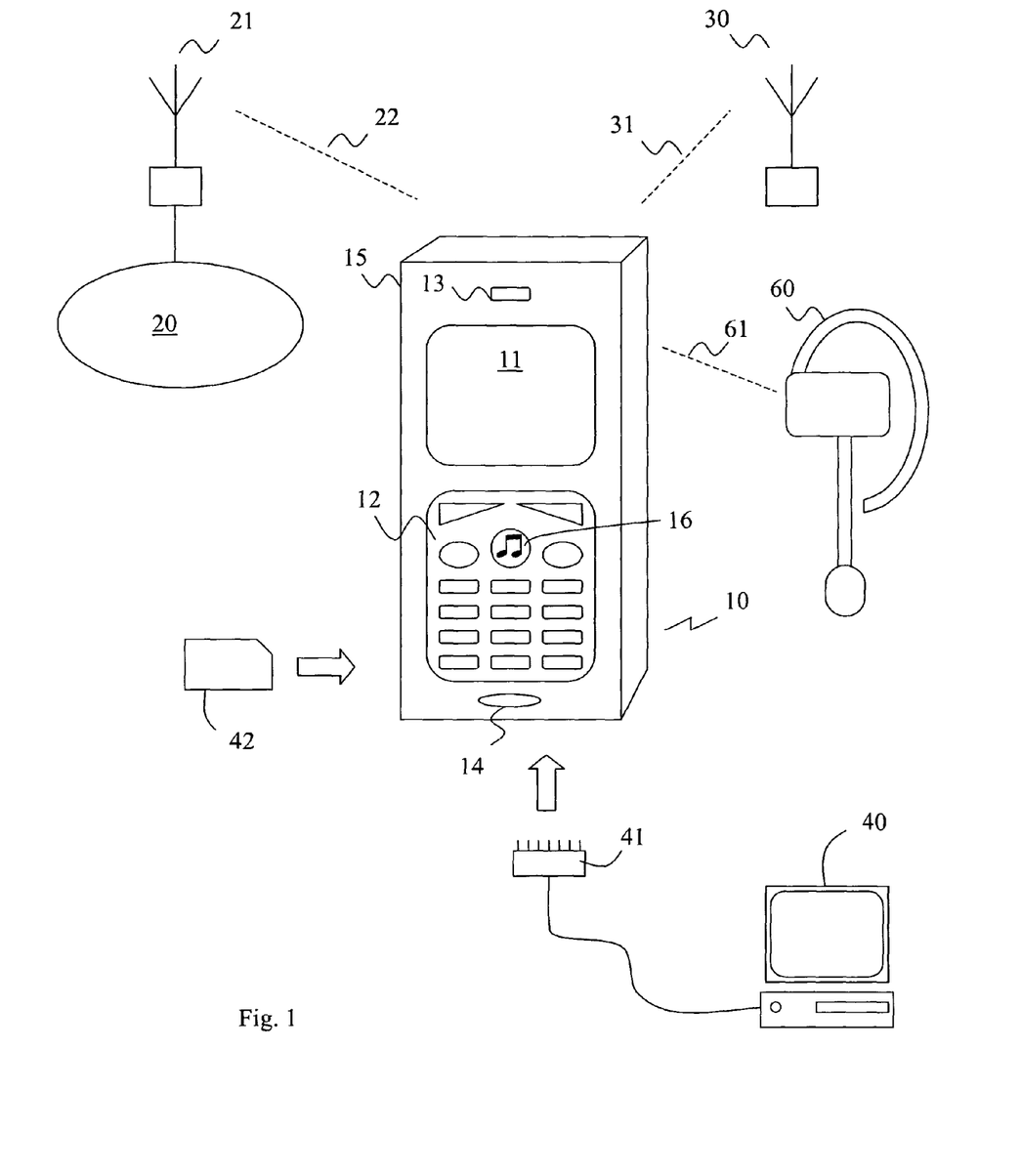

FIG. 1 illustrates a typical arena for an embodiment of the present invention, comprising a mobile phone 10 which includes a media player. The media player may be a digital video player, but will now be described as being a digital audio player such as an mp3 player. The functional structure of mobile phone 10 will be described in more detail with reference to FIG. 3, but in FIG. 1 it is illustrated that mobile phone 10 includes a display 11, e.g. a liquid crystal display. Display 11 is mainly used for information or image output purposes to a user of the mobile phone 10, but may also incorporate a touch-sensitive film for sensing input commands according to the established art. A user input interface comprises a keypad 12 with a number of keys is normally also included. Keypad 12 may also include a navigation or cursor control device, such as a joystick. In order to be operative as a mobile phone, a speaker 13 and a microphone 14 are further included. A cover or chassis 15 carries the elements of the mobile phone. The mobile phone 30 includes radio transmission and reception electronics connected to an antenna, such as a traditional stub antenna or a built-in low profile antenna device inside the housing 15, for communicating with a base station 21 of a mobile telephony network 20 over an air interface. For the purpose of making circuit-switched telephone calls network 20 may e.g. be a GSM (Global System for Mobile Communications) network. However, in order for mobile phone 10 to be able to receive streaming media, a packet-switched communication link 22 is preferably used, such as GPRS (General Packet Radio Service), which is an enhancement to the GSM that supports data packets. Alternatively, a third generation mobile network 20 is employed, such as UMTS (Universal Mobile Telephony system). Communication link 22 is consequently usable both for communication with other users and for receiving streaming media, such as streaming radio. Furthermore, communication link 22 may also be used for downloading media files to a local memory in the mobile phone.

Optionally or additionally to being adapted to receive streaming media, mobile phone may also be adapted to receive real time media signals from a media source 30, transmitting a modulated media signal. Media source 30, e.g. a broadcast station for transmitting video or only audio over the air through an antenna, may be a television station or an FM radio station. A different antenna is typically employed in mobile phone 10 for receiving media signals 31 from the real time media source 30, since such transmission is generally achieved over a completely different frequency band than telecommunications signals 22. The antenna (not shown) for receiving real time media signals may be incorporated in the mobile phone, or be realized using a connectable antenna, such as a cord.

Besides being able to receive media signals over the air, it is also possible to receive media data by wire from another media source, such as a computer 40 having a connector 41 for coupling to a system connector of the mobile phone. Such a media source 40 may be used both for transmitting streaming media and for downloading complete media files to a local memory.

A local memory for storing media files is included in the mobile phone 10, from which memory the files may be accessed for playing by the built-in media player. The local memory may be fixed in the mobile phone 10, and may optionally be combined with an exchangeable memory stick 42.

Consequently, the embodiment of FIG. 1 shows a radio communication terminal in the form of a mobile phone 10, which includes a media player. The media player may be a digital audio player or a digital video player, and is capable of accessing media data from different sources, such as locally stored media files, streaming media data or real time media received as a modulated signal. Furthermore, mobile phone 10 has a user interface input includes a key 16 for automatically storing of data related to a media item which is currently played. Key 16 is common for storing such media-related data regardless of from which media source the media item is accessed and played. The type of data stored, and how the stored data is made accessible for later retrieval, is automatically selected dependent on from which type of source the currently played media item is accessed, without the user having to make any other decision than to activate the key 16. Preferably, and as illustrated, key 16 carries an marking indicating its function to a user.

Figure 2:
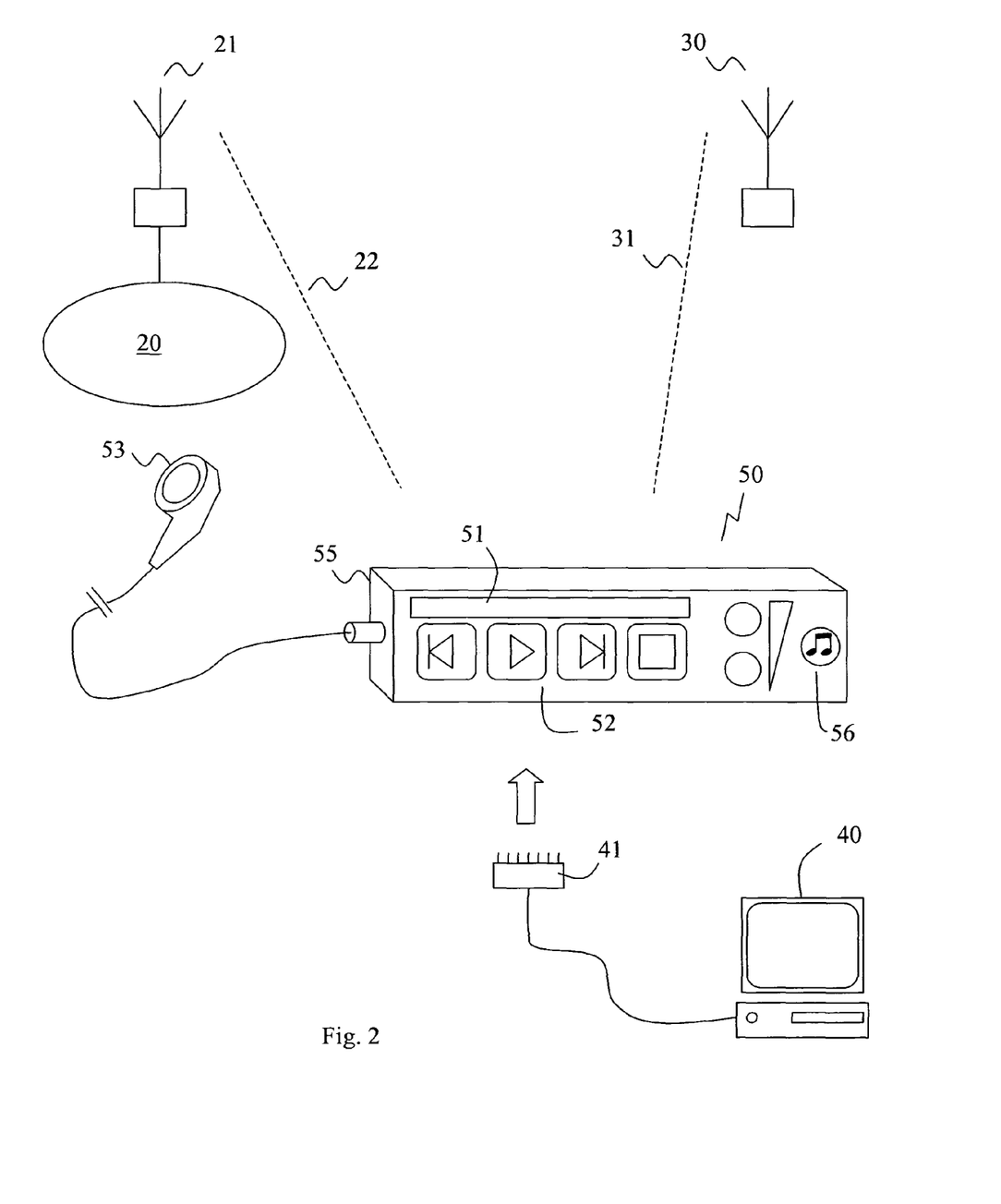
FIG. 2 schematically illustrates a second embodiment of the invention, including a media player comprising means for accessing media from different sources and carrying a key for automatically storing media data relating to a currently played or captured media item.

FIG. 2 illustrates a second embodiment, comprising a media player 50 in the form of a portable digital music player, such as an mp3 player. Media player 50 comprises a display 51, usable for presenting information of played songs, and menus for browsing when searching for music tracks, albums or the like. A user input interface 52 comprises a number of keys for maneuvering the media player, such as play and skip, but preferably also a navigation key for scrolling in presented menus. A socket for connecting an earpiece 53 or external loudspeakers is included for outputting played music. Corresponding to the previous embodiment, one single key 56 is further included, carrier on a casing 55, which may be activated for automatically storing data related to a currently played music track. A portable music player 50 is predominantly used for playing music accessed from a built in music file memory. However, media player 50 is also capable of receiving music signals from at least one more type of source. Similar to the previous embodiment, this type of music signals may be streaming radio 22 received over the air from a streaming radio broadcast centre 21, or streaming audio received over wire upon connection with a computer 40, which in turn is connected via a network to a streaming audio transmitting station (not shown). As an alternative to, or instead of receiving streaming audio, media player 50 may be devised to receive real time modulated wave signals 31, such as FM radio, from a broadcasting station 30. In either case, one or more antennas must be included in the media player for receiving over-the-air transmission of audio signals. Key 56 is common for storing data related to a currently played audio item, typically a music track, regardless of from which media source the media item is accessed and played. The type of data stored, and how the stored data is made accessible for later retrieval, is automatically selected dependent on from which type of source the currently played audio item is accessed, without the user having to make any other decision than to activate the key 56.

Figure 3:
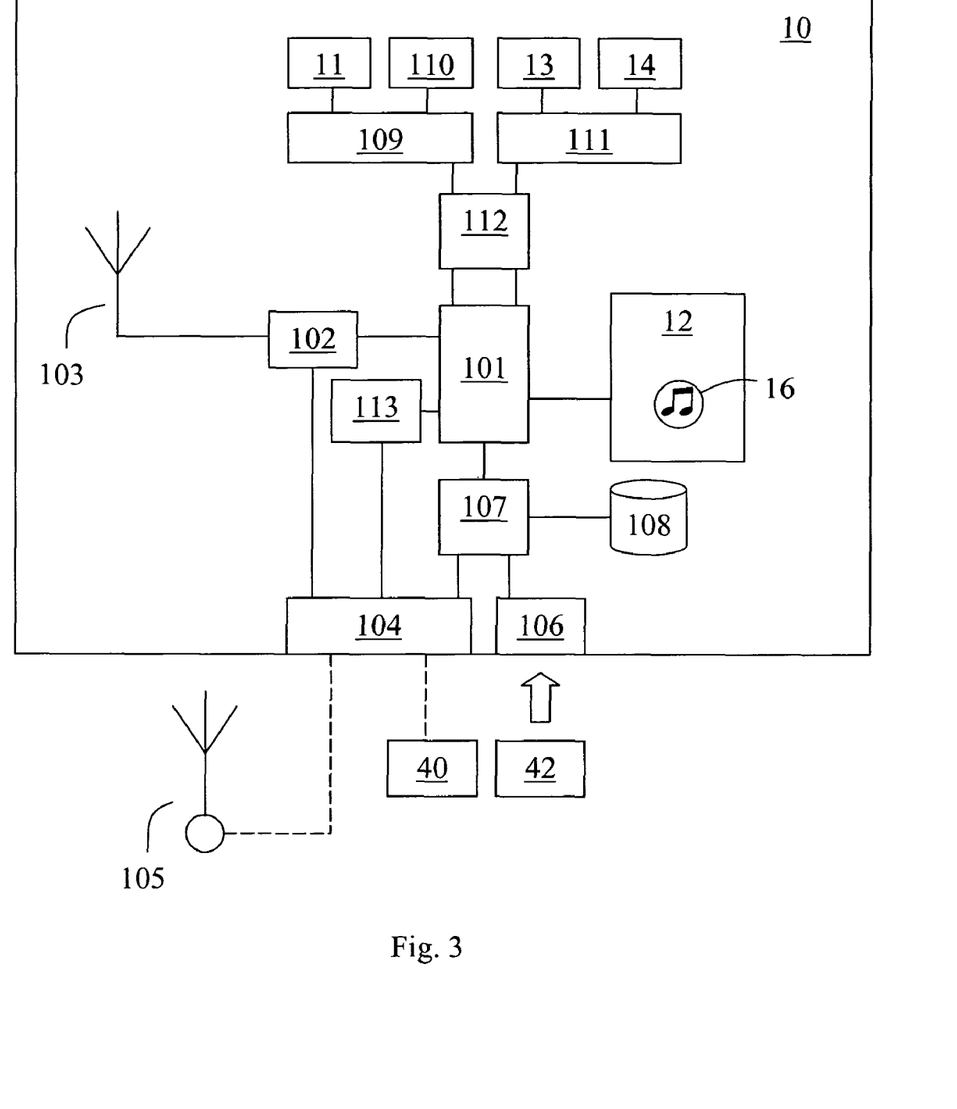
FIG. 3 illustrates a block diagram over functional elements of a radio communication terminal according the embodiment of FIG. 1.

FIG. 3 illustrates schematically the internal structure of a radio communication terminal 10 as shown in FIG. 1, incorporating a media player function devised in accordance with an embodiment of the invention. Elements corresponding to FIG. 1 carry the same reference number. It should be pointed out that FIG. 3 does not describe all details or elements that may be included in a terminal devised in accordance with the invention, merely elements which are of importance for carrying out the invention, and some optional elements. It should also be noted that the illustrated elements do not necessarily represent real components but rather functional blocks, and that different functions may in fact be shared by common components. A reader skilled within the field of radio communication terminals will realize that there are numerous ways of designing a terminal as presented in FIG. 3, which structurally is similar to many contemporary radio communication terminals.

Terminal 10 comprises a control unit 101, preferably comprising at least one microprocessor with associated memory and operation software for handling internal signaling in the terminal. A transceiver unit 102 is connected to the control unit 10, and comprises radio transmission and reception electronics, including central processing, signal processing, coding and decoding. For the case where terminal 10 is also capable of receiving streaming radio, transceiver unit 102 also includes a data buffer in which received streaming data is temporarily held before presentation as audio or video. Transceiver unit 102 is connected to a radio antenna 103, which is illustrated as forming part of terminal 10. Typically, antenna 103 may be a built-in low profile antenna cooperating with a ground plane, such as a PIFA (Planar Inverted-F Antenna) or other type, devised for single or multi-band radio transmission with a base station. Optionally, antenna 103 may be an external detachable antenna. A data storage and access unit 107 is connected to the control unit, and is linked to a memory 108. Under control through control unit 101, data storage and access unit 107 is operated to store and access data in memory 108, which preferably includes a built-in memory, and in the case of terminal 10 being a mobile phone, also a detachable SIM (Subscription Identification Module) or corresponding type of chip. Memory 108 may be used for storing media files, contact lists, and so on. In order to use terminal 10 for telecommunication purposes, a user input interface 12, such as a keypad, is operatively connected to control unit 101. A user output interface includes a display panel 11, connected to control unit 101 via an image control unit 109. Terminal 10 may also include a digital picture camera or video camera 110, illustrated here as connected to image control unit 109. Image data representing captured still pictures or video using camera 110 may be stored in memory 108. An audio control unit 111 connects control unit 101 to a speaker 13 or to a socket for an external speaker. Audio control unit 111 also connects a microphone 14 to control unit 101. A media player 112 is connected to control unit 101, and preferably operated by means of user input interface 12, and is further connected to image control unit 109 for the case of presenting picture or video images, or information regarding a media item, on display 11. Media player 112 is preferably also connected to audio control unit 111 for presentation of sound. A power source 113, typically a battery, provides electrical power to all units included in the terminal, even though it is only illustrated as connected to control unit 101 for the sake of simplicity. In order to recharge battery 113, a connection is provided to a system connector 104, to which a battery charger may be connected. System connector 104 may also be employed for connecting a wire, illustrated by the dashed line, to a external unit 40 such as a computer, for downloading or transmitting data to and from memory 108 through data storage and access unit 107. Another way of uploading or downloading data to the terminal 10, is to attach a memory stick 42 to a socket 106 in terminal 10. FIG. 3 also illustrates selective connection of an auxiliary antenna 105 to system connector, for receiving modulated radio signals such as FM radio. A state of the art solution is to combine such an FM antenna with a cord to a portable handsfree speaker and microphone, but antenna 105 may just as well be a separate antenna. Radio signals received through antenna 105 are also handled by transceiver unit 102, where demodulating is performed to extract the code of the received signal, which typically comprises audio but possibly also video code. In accordance with an embodiment of the invention, user input interface 12 of terminal 10 comprises a key 16, activation of which is arranged to trigger automatic storing of media data in memory 108, representing a currently played media item. Dependent on from which media source the played media is accessed, different types of media data is stored without the user having to take decisions or select where to store the data. The media data may be real media code of a video or audio file. It may also simply be meta data stored in a playlist, addressing an already stored media file in memory 108. Alternatively, the automatically stored data may simply de an identification of a media item, such as a title, which is stored in a directory.

An example of how an embodiment according to that of FIGS. 1 and 3 may work, for the case of the terminal 10 being mobile phone and the media being music, will now de described.

A user of mobile phone 10 is listening to locally stored music accessed from an mp3 music file in a local memory 108. The played music is presented to the user through a speaker in a headset 60, communicatively connected by radio 61, e.g. Bluetooth, to an antenna in terminal 10. Pressing a specially assigned music key 16 on the phone 10 while listening to the locally stored music triggers data storage and access unit 107 to automatically add an identification of the played track to a special playlist called My Favorites. This playlist is available from a menu system presentable on display 11 like any other playlist in the phone. The next time the user synchronizes his music library in memory 108 with a PC 40, using transceiver unit 102 and system connector 104, a communication software program residing in PC 40 is arranged to copy the My Favourites playlist from terminal 10, and use it as a basis for specialized offers to the user, preferably by connection over the Internet with a music service provider, such as or corresponding to Sony Connect. The communication software program is preferably also devised to keep all items in My Favorites in the phone and additionally sync in similar music from the users own library in the PC, dependent on e.g. artist or genre. For locally stored music, activation of the music key 16 is thus adapted to create and modify a playlist of music track stored in the terminal. As an alternative to using a communication interface 104 to communicate with computer 40, terminal 10 may connect through a wireless communication interface using transceiver unit 102 and antenna 103 to a base station of a mobile network, to the music service provider.

In a second scenario, the user is listening to streaming radio, accessed over the air to antenna 103 in a UMTS network. When the user presses music key 16, the currently played track is automatically added to a special playlist or channel called My Radio. Preferably, an identity code for the track is received along with the streaming radio data, such as artist and track title, which are saved in the My Radio playlist. The tracks in My Radio are thereby used to create a unique streaming channel specialized for the user. This technology is already available in StreamMan today, but is made simpler by the introduction of music key 16. Alternatively to accessing the streaming radio signal through a wireless communication interface with antenna 103 to the mobile phone network, it may be accessed by connection via a communication interface using system connector 104 and computer 40 to the Internet.

In a third scenario, the user is listening to FM radio through headset 60. Pressing the music key 16 when listening to FM Radio instantly starts recording a clip of the music, e.g. 10 seconds, using a recording function in media player 112, and the recorded music is saved in a special playlist called Sound Tags. The user can then later decide to play any of the stored clips in Sound Tags, for the purpose of asking someone else what track it is. Finding this out may also be performed using an Internet service, such as Gracenote®, which is capable of identifying songs from brief clips. The feature of automatically saving the clip in a dedicated playlist means that it can be done fast, and that it will be easily found. Preferably, the recorded sound clip is identified in the playlist by the date and time for storing it, and potentially also an identification of the FM radio channel or its frequency. Furthermore, saving the track to a playlist instead of immediately sending it to an Internet service has the advantage of the user not having to pay for the Internet service, e.g. if a friend turns out to be capable of identifying the track from the clip. As an alternative to a frequency modulated signal, an amplitude or code modulated signal may be employed.

The three scenarios above indicate how the music key according to the invention may be used when listening to locally stored music, streaming radio, or FM radio. Since the phone knows which of these types of media sources the music currently playing is accessed, it is also capable of storing special type of music data in a special place, dependent on said type.

If, on the other hand, music or other audio is not currently played through the mobile phone using its media player 112, and neither FM or streaming radio is currently accessed, activation of key 16 will then start recording of a clip of the surrounding sound of phone 10, using speaker 14 or potentially a speaker of headset 60. The clip is further automatically saved in a playlist, preferably in the mentioned list Sound Tags. Therein, the clip is advantageously identified as being something else than a radio recording, such as by automatically naming it "Live", whereby such recording are easier to find if the Sound tags playlist is large. This feature may be used to record music heard through another music player or even live, for future identification or sharing similar to the FM radio case described above. In one embodiment, the clip is recorded for a preset length, such as 10 seconds, upon clicking music key 16 once. However, in another embodiment the music key 16 is automatically set to maintain recording as long as the music key is held down, and to interrupt recording when the music key is let go. If no audio is presented through the mobile phone, from local memory, streaming radio or FM radio, the music key may thereby be used for taking brief record of the user's voice, e.g. in order to make memory notes. This provides a simple way of swiftly taking notes without having to use keys or a touch-sensitive display for entering the information in the phone.

Once data related to a track currently played through the phone 10, or a live audio recording captured by a microphone in or connected to the phone, is stored by pressing of music key 16, the stored data will be accessible through the normal menu system in the phone 10. The invention thereby provides a simple and fast tool for storing media data with a radio communication terminal incorporating a media player, or a media player incorporating radio receiver means for receiving media signals from external sources. The dedicated key 16 is preferably a real mechanical or touch-sensitive key, but may also be a softkey or a field on a touch sensitive display. In the illustrated embodiments, the dedicated key 16 is placed on the cover or chassis of the terminal or media player. However, in an alternative embodiment (not shown) the key 16 is played on a control panel of a headset connectable to the terminal or media player. It is already well known to have e.g. a button for answering or terminating calls on a mobile phone portable headset, or start, stop, skip and volume buttons on a media player headset. In an embodiment incorporating the dedicated key 16 on such an external control panel, activation of key 16 will automatically be relayed to the terminal or media player by a wired signal or a wireless signal, in which the storing action it is set to trigger will be performed.

The present invention has been described by reference to suitable embodiments and modes of operation, for using a single common key for automatically storing data related to a surrounding or currently played media item in a way that is dependent on the source of the media. The presented embodiment relating to audio, especially music, can also be devised to work for images. In such an embodiment, the different sources include a local memory or memory stick with locally stored images or videos, a streaming video input for receiving streaming video over the air or through a cable to a computer 40, or broadcast live video received through a TV antenna. If the terminal or media player does not receive through any of these sources, images currently captured through built-in camera 110 is recorded. Corresponding to the previously described embodiment, key 16 may be programmed to trigger recording of a video clip of preset length upon activation, or to record while being activated. Saving of captured video clips or video data from local memory, streaming video or broadcast live video, is preferably performed in the corresponding manner as described for the case of audio, after which saved data is easily accessible through a menu system of the terminal or media player using its display and user input interface for browsing. The dedicated key for storing image data may be incorporated alone or together with the music key, and carry a marking identifying it clearly as an image or video key, e.g. symbol of a camera.

Many variations and modifications can be made to the preferred embodiments without substantially departing from the principles of the present invention. All such variations and modifications are intended to be included herein within the scope of the present invention, as set forth in the following claims.

That which is claimed:

1. An electronic device, comprising
a media player;
a control unit, operable to selectively access any one of a plurality of media sources, each of the media sources comprising:
   a memory comprising locally stored media data,
   a signal input for media data received through a communication connection from an external source,
   a microphone for recording surrounding sound of the electronic device, and
   a media recorder for capturing media data from any of the signal input and the microphone; and
a single user-operable key, which upon activation is configured to trigger the control unit to store data related to a currently accessed media source in a playlist, which playlist is automatically selected dependent on from which one of the media sources the media data is accessed.

2. An electronic device according to claim 1, wherein said memory contains at least one media file that is playable using said media player, and wherein activation of the user-operable key triggers storing of a directory address to a currently played media file in a local playlist.

3. An electronic device according to claim 2, further comprising
a communication interface connectable to a communication station over a network, and a transceiver unit, for transmitting the local playlist to the communication station and receiving offers from the communication station tailored according to content of the local playlist.

4. An electronic device according to claim 1, wherein said signal input comprises
   a streaming media signal input; and
   a data buffer;
   wherein activation of the user-operable key triggers storing of an identity code, associated with a currently received media signal, in a streaming media playlist.

5. An electronic device according to claim 4, wherein said identity code is retrieved from the streaming radio signal.

6. An electronic device according to claim 1, wherein said signal input comprises:
   a modulated radio signal input; and
   a demodulator;
   wherein activation of the user-operable key triggers recording of a clip of a media item from a received modulated radio signal, and storing of a tag associated with the recorded clip in a media tag playlist.

7. An electronic device according to claim 1,
   wherein activation of the user-operable key triggers recording of an audio clip of what is received by the microphone, and storing of a tag associated with the recorded audio clip in an audio tag playlist.

8. An electronic device according to claim 1, wherein the media recorder comprises
   a camera;
   wherein activation of the user-operable key triggers recording of an image clip that is recorded by the camera, and storing of a tag associated with the recorded image clip in an image tag playlist.

9. An electronic device according to claim 7, further comprising:
   a communication interface connected to the control unit and configured to transmit an audio clip to a music detection station over a network, and to receive information related to the content of the audio clip as retrieved by the music detection station.

10. A radio communication terminal, comprising
    an audio output;
    an audio player devised to play music tracks through the audio output;
    a control unit, operable to selectively access a music track from any one of a plurality of different types of media sources, at least one of the media sources comprising:
      a microphone for recording surrounding sound of the radio communication terminal; and
      a media recorder for capturing media data from the microphone; and
    a single user-operable key, which upon activation when a music track is played triggers the control unit to store data related to that music track in a playlist, which playlist is automatically selected dependent on from which type of media source the music track has been accessed.

11. A radio communication terminal according to claim 10, wherein said plurality of different types of media sources comprises a local memory for storing audio files, wherein activation of the user-operable key triggers storing of a directory address of an audio file associated with the played music track in a local playlist.

12. A radio communication terminal according to claim 11, wherein said local memory is connectable to a detachable memory stick.

13. A radio communication terminal according to claim 11, further comprising a communication interface connectable to a communication station over a network, for transmitting the local playlist to the communication station and receiving offers from the communication station tailored according to content of the local playlist.

14. A radio communication terminal according to claim 10, wherein said plurality of different types of media sources comprises
    a streaming radio signal input; and
    a data buffer;
    wherein activation of the user-operable key triggers storing of an identity code, associated with the played music track, in a streaming radio playlist.

15. A radio communication terminal according to claim 14, further comprising
    a communication interface connectable to a streaming radio station over a network for transmitting the streaming radio playlist to a streaming radio station to configure a personal streaming radio channel transmitted by the streaming radio station based on content of the streaming radio playlist.

16. A radio communication terminal according to claim 14, wherein said plurality of different types of media sources comprises
    a modulated radio signal input; and
    a demodulator;
    wherein activation of the user-operable key triggers recording of an audio clip of the played music track using an audio recorder connected to the media player, wherein a tag associated with the recorded audio clip is stored in an audio tag playlist.

17. A radio communication terminal according to claim 11, wherein said plurality of different types of media sources comprises
    a microphone, wherein activation of the user-operable key triggers recording of an audio clip of what is received by the microphone using an audio recorder connected to the microphone, wherein a tag associated with the recorded audio clip is stored in an audio tag playlist.

18. A radio communication terminal according to claim 16, further comprising
    a communication interface connected to the control unit and configured to transmit an audio clip to a music detection station over a network, and to receive information related to content of the audio clip as retrieved by the music detection station.

19. A radio communication terminal according to claim 10, further comprising
    a communication interface connected to the control unit and comprising a transceiver unit and an antenna for wireless connection with a radio base station of a network; and
    a data storage and access unit for accessing data related to a playlist and incorporating said data in a communications signal addressed to a receiving station in said network.

20. A radio communication terminal according to claim 10, further comprising
    a communication interface connected to the control unit and comprising a transceiver unit and a system connector for an Internet connection via a computer; and
    a data storage and access unit for accessing data related to a playlist and incorporating said data in a communications signal addressed to a receiving station on the Internet.

21. A media player, comprising:
    a media presentation unit;

a first media source comprising a media file memory for storing media files;

a second media source including a media signal input for receiving a media signal;

a third media source comprising:
  a microphone for recording surrounding sound of the media player; and
  a media recorder for capturing media data from the microphone;

a control unit, operable to selectively control access and presentation of a media item from any of the first, second and third media sources on the media output; and a single user interface input connected to the control unit, wherein activation of the user interface during presentation of the media item triggers storing of data related to that media item in a playlist which is automatically selected dependent on from which media source the presented media item is accessed.

22. A media player according to claim 21, wherein the media presentation unit is configured to play video items, and wherein the media presentation unit comprises:
  a speaker connection for presentation of audio.

23. A media player according to claim 22, wherein said audio is a music track.

24. A media player according to claim 21 wherein the media presentation unit is configured to play video items, and wherein the user interface output comprises a display connection for presentation of images.

25. A media player according to claim 21, wherein the media signal input is configured to receive a media signal in the form of streaming media code, the media signal input comprising:
  a data buffer for buffering a received media signal before presentation.

26. A media player according to claim 21, wherein activation of the user interface input during presentation of a media item accessed from the first media source triggers the control unit to store a directory address of a data file associated with the media item accessed from the first media source in a local playlist related to the media file memory.

27. A media player according to claim 25, wherein activation of the user interface input during presentation of a media item accessed from the second media source triggers the control unit to store an identity code associated with the media item access from the second media source in a streaming media playlist.

28. A media player according to claim 21, wherein the media signal input is configured to receive a real time media signal in the form of a modulated signal, and comprises:
  a demodulator for retrieving a media item from the media signal for presentation.

29. A media player according to claim 25, further comprising
  a third media source comprising a second media signal input for receiving a real time media signal in the form of a modulated signal, the second media signal input comprising:
  a demodulator for retrieving a media item from the media signal for presentation.

30. A media player according to claim 28, further comprising
  a media recorder configured to record a real time media signal representing a media item, and
  a media clip memory, wherein activation of the user interface during presentation of a media item from a received real time media signal triggers the control unit to record a media clip of that media item, and to store a tag associated with the recorded media clip in a media tag playlist.

31. A media player according to claim 29, wherein the real time media signal is a frequency modulated radio signal.

32. A media player according to claim 21, wherein the media player comprises at least a portion of a radio communication terminal.

33. A media player according to claim 21, wherein said user interface input is a key carried on the media player.

* * * * *